(12) United States Patent
Bennett et al.

(10) Patent No.: US 10,639,774 B2
(45) Date of Patent: May 5, 2020

(54) EXTRACTION APPARATUS

(71) Applicant: THE BOEING COMPANY, Chicago, IL (US)

(72) Inventors: Don Bennett, Melbourne (AU); Cameron Edwards, Melbourne (AU)

(73) Assignee: THE BOEING COMPANY, Chicago, IL (US)

( * ) Notice: Subject to any disclaimer, the term of this patent is extended or adjusted under 35 U.S.C. 154(b) by 265 days.

(21) Appl. No.: 15/723,275

(22) Filed: Oct. 3, 2017

(65) Prior Publication Data

US 2019/0099868 A1     Apr. 4, 2019

(51) Int. Cl.

| | |
|---|---|
| *B25B 28/00* | (2006.01) |
| *B23P 19/04* | (2006.01) |
| *B64F 5/10* | (2017.01) |
| *B25B 27/02* | (2006.01) |
| *B25C 11/00* | (2006.01) |
| *B25B 27/04* | (2006.01) |

(52) U.S. Cl.
CPC ............. *B25B 28/00* (2013.01); *B23P 19/04* (2013.01); *B25B 27/026* (2013.01); *B25B 27/04* (2013.01); *B25C 11/00* (2013.01); *B64F 5/10* (2017.01); *B23P 2700/01* (2013.01)

(58) Field of Classification Search
CPC ....... B25B 27/04; B25B 27/026; B25C 11/00; B64F 5/10; B23P 19/04; B23P 2700/01
See application file for complete search history.

(56) References Cited

FOREIGN PATENT DOCUMENTS

DE     3822655 C1 *    2/1990   ......... B23K 11/3072

* cited by examiner

*Primary Examiner* — John C Hong
(74) *Attorney, Agent, or Firm* — The Small Patent Law Group, LL; Philip S. Hof

(57) ABSTRACT

An extraction apparatus includes an arm and an extractor head mechanically connected to a first end of the arm. The extractor head includes a housing that defines a channel, a switch within the channel, a fork member within the channel, and an actuator device mounted to the housing. The switch is configured to detect reception of a fastener pin being received within the channel. The fork member is movable relative to the housing. The actuator device is mechanically connected to the fork member, and is operatively connected to the switch. Responsive to the switch detecting the reception of the fastener pin in the channel, the actuator device is configured to automatically move the fork member linearly within the channel from a start position towards a displaced position causing the fork member to remove the fastener pin from a work piece.

20 Claims, 6 Drawing Sheets

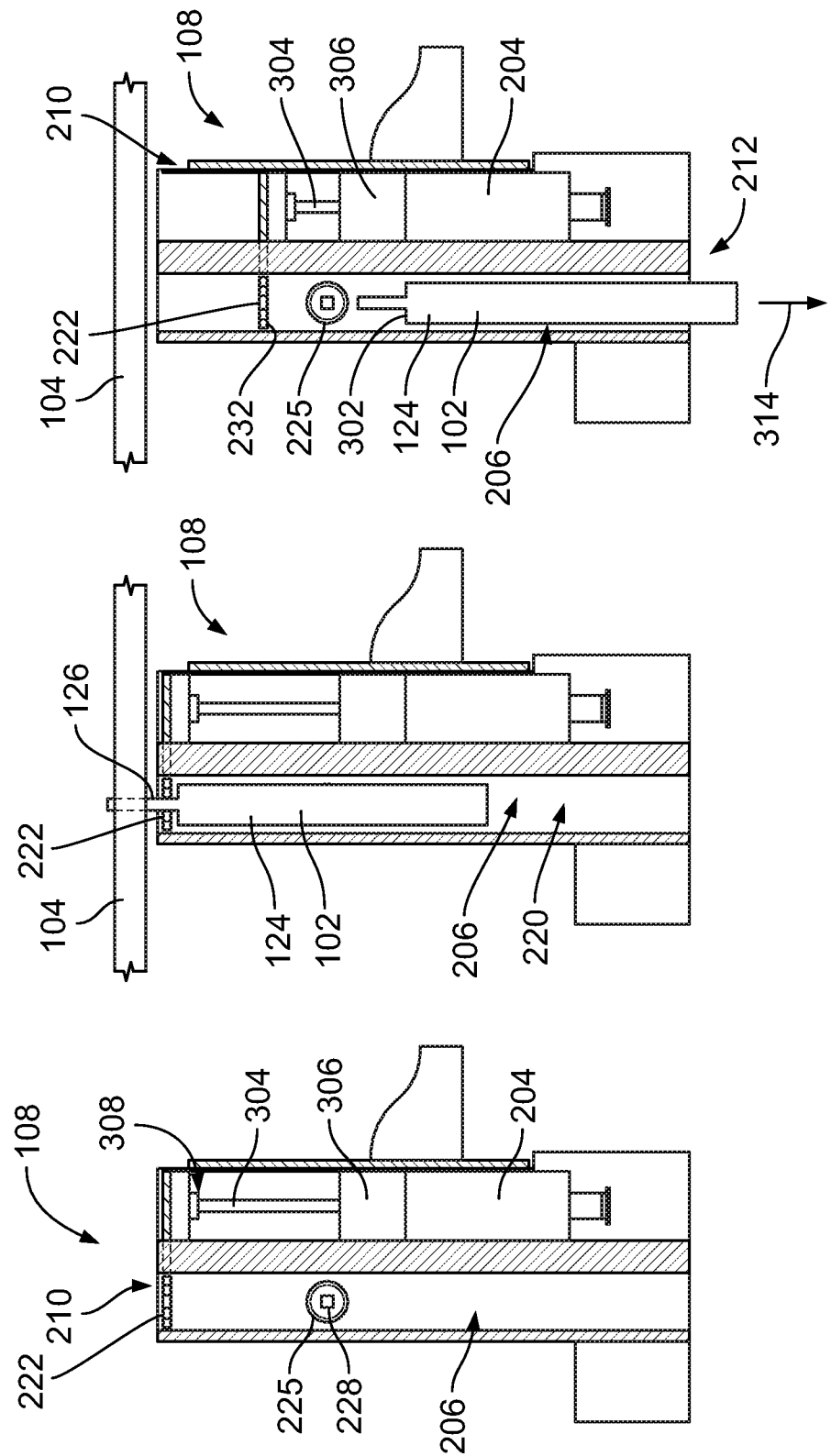

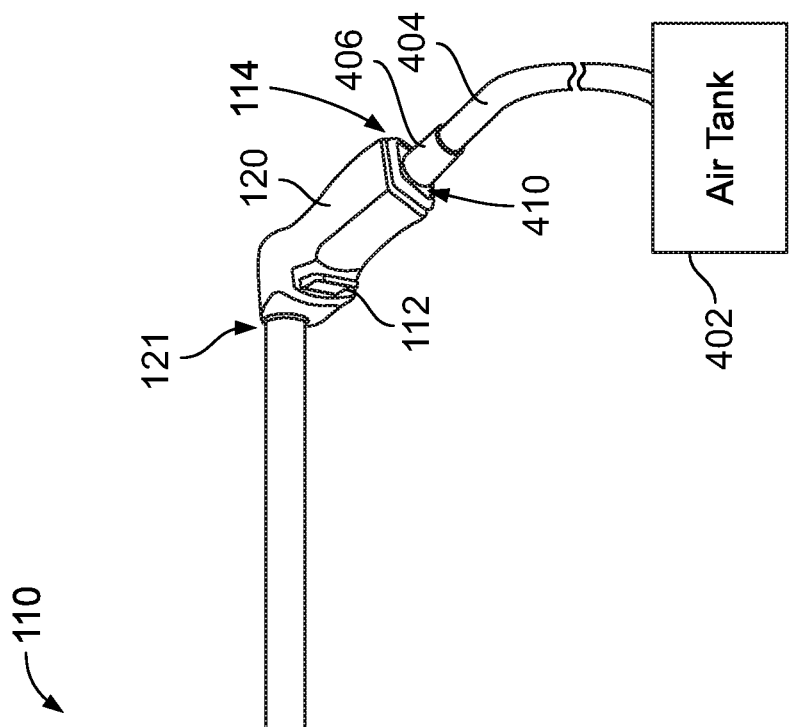
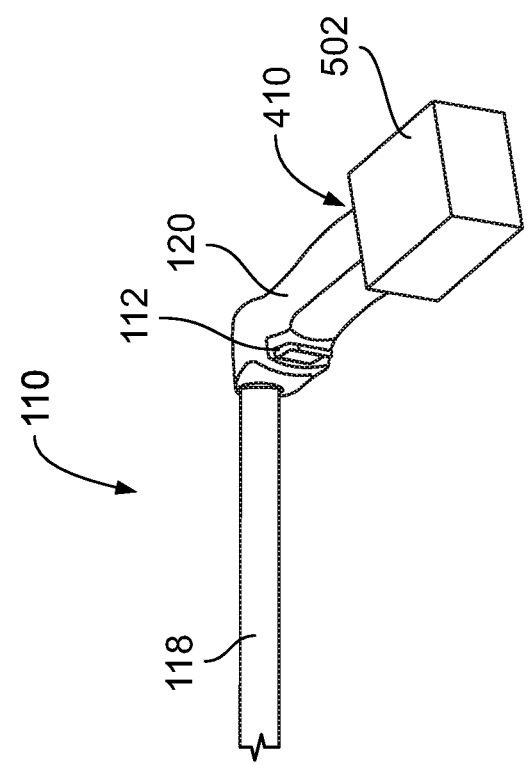

EXTRACTION APPARATUS

FIELD

Embodiments of the present disclosure generally relate to industrial manufacturing, such as the manufacturing of commercial aircraft, and, more particularly, to an apparatus for enabling the extraction of temporary fasteners from a work piece during a manufacturing process.

BACKGROUND

During the assembly of commercial aircraft, fasteners referred to as power pins are inserted into pre-drilled holes in a work piece to provide a temporary clamping force on the work piece. For example, the work piece may include multiple panels that are stacked on each other, and the power pins may be inserted through holes in the panels and tightened using a torque gun to secure the panels together during at least one subsequent processing step, such as the application and/or curing of a sealant. The power pins are removed, after the subsequent processing step(s), by loosening the power pins with the torque gun to release the clamp force. Even after loosening the power pins, typically some or all of the power pins may remain in the corresponding holes of the work piece due to engagement with a sealant on the work piece, for example.

The remaining power pins on the work piece are typically manually removed. The removal of each power pin from the work piece requires significant force, such as between about 10 pound-force (lbf) and about 15 lbf. An operator may have to adopt an awkward body posture that includes bending over, reaching overhead, or the like, in order to engage the power pins. Furthermore, some power pins may require more force to remove than other power pins. The operator may increase the force applied to the power pin to a level that risks damaging the work piece. For example, a bent power pin may chip or crack the work piece when the operator removes the power pin with an increased amount of force, requiring the work piece to be repaired and/or discarded.

SUMMARY

A need exists for assisting in the removal of fasteners, such as power pins, from work pieces that reduces the strain on the operator. A need also exists for assisting in the removal of the fasteners that limits the amount of force applied to the fasteners to reduce the risk of damaging the work piece. A need exists for an efficient and effective way of removing the fasteners, which can number in the hundreds or thousands.

With those needs in mind, certain embodiments of the present disclosure provide an extraction apparatus that includes an elongated arm having a first end and a second end, and an extractor head mechanically connected to the first end of the arm. The extractor head includes a housing that defines a channel, a switch within the channel, a fork member within the channel, and an actuator device mounted to the housing. The switch is configured to detect reception of a fastener pin within the channel. The fork member is movable relative to the housing, and is configured to engage the fastener pin that is within the channel. The actuator device is mechanically connected to the fork member, and is operatively connected to the switch. Responsive to the switch detecting the reception of the fastener pin in the channel, the actuator device is configured to automatically move the fork member linearly within the channel from a start position towards a displaced position causing the fork member to remove the fastener pin from a work piece.

In at least one embodiment, actuator device is a pneumatic actuator device that is configured to move the fork member from the start position to the displaced position using pressurized air. In at least one other embodiment, the actuator device is an electric actuator device that is configured to move the fork member from the start position to the displaced position using electrical energy supplied by one or more of a battery mounted to the arm or a power cable plugged into an external electrical power source.

In one or more embodiments, the switch within the channel is a mechanical switch that is configured to detect the reception of the fastener pin within the channel responsive to the fastener pin engaging and displacing the mechanical switch. In one or more other embodiments, the switch within the channel is a proximity sensor that is configured to detect the reception of the fastener pin within the channel responsive to detecting that the fastener pin is within a designated threshold range of the proximity sensor.

Certain embodiments of the present disclosure provide a method of removing a fastener pin from a work piece. The method includes coupling an actuator device of an extraction apparatus to a power source. The extraction apparatus includes an extractor head and an elongated arm that is mechanically coupled to the extractor head. The actuator device is mounted on the extractor head. The extractor head defines a channel. The arm includes a manual trigger configured to be engaged by an operator. The method includes positioning the extraction apparatus such that a fastener pin attached to a work piece is received into the channel of the extractor head. The method also includes detecting reception of the fastener pin within the channel via a switch mounted within the channel. The switch is operatively connected to the actuator device. Responsive to the detection of the reception of the fastener pin within the channel occurring concurrently with displacement of the manual trigger, the method includes automatically actuating the actuator device to move a fork member of the extractor head within the channel such that the fork member engages and forces the fastener pin away from the work piece.

Certain embodiments of the present disclosure provide an extraction apparatus that includes an extractor head and an elongate barrel. The extractor head defines a channel sized and shaped to receive a fastener pin therein. The extractor head includes a pneumatically-actuated slide cylinder that is operatively coupled to a switch disposed within the channel of the extractor head. The switch is configured to detect reception of the fastener pin within the channel. The slide cylinder is mechanically coupled to a fork member disposed within the channel. The elongate barrel has a first end and a second end. The second end is mechanically connected to the extractor head. The elongate barrel is configured to deliver pressurized air to the slide cylinder on the extractor head. The elongate barrel includes a manual trigger that controls delivery of the pressurized air to the slide cylinder. Responsive to displacement of the manual trigger occurring concurrently with detection of the reception of the fastener pin within the channel by the switch, the slide cylinder uses the pressurized air to move the fork member within the channel, forcing the fastener pin away from a work piece.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein:

FIG. 4 is a cross-sectional view of the extractor head of the extraction apparatus according to an embodiment of the present disclosure at a first stage of operation;

FIG. 5 is a cross-sectional view of the extractor head of the extraction apparatus shown in FIG. 4 at a second stage of operation with a fastener pin within a channel of the extractor head;

FIG. 6 is a cross-sectional view of the extractor head of the extraction apparatus shown in FIGS. 4 and 5 at a third stage of operation after extricating the fastener pin from a work piece;

FIG. 7 is a perspective view of an arm of the extraction apparatus according to an embodiment of the present disclosure;

FIG. 8 is a perspective view of a portion of the arm of the extraction apparatus according to another embodiment of the present disclosure.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide an extraction apparatus for use in manufacturing to remove a temporary fastener pin from a work piece. The temporary fastener pin in one or more embodiments is a wedge-lock power pin, but the embodiments of the extraction apparatus described herein may be configured to remove other types of fastener pins in addition to wedge-lock power pins. The embodiments of the extraction apparatus may remove the fastener pins via a semi-automatic process that is more efficient than removing the fastener pins by hand. Further, the extraction apparatus is more ergonomic, and requires less manual exertion than pulling the fastener pins by hand.

Furthermore, using the extraction apparatus may eliminate or otherwise reduce the risk of damage to the work piece when removing the fastener pins from the work piece. In one or more embodiments, the extraction apparatus is configured to not exceed a designated force threshold applied to the fasteners. Therefore, if a fastener pin fails to dislodge from the work piece at forces up to the upper threshold (e.g., due to being damaged), the extraction apparatus does not surpass the upper threshold to exert an amount of force on the fastener pin which could potentially damage the work piece. In such case, an operator may use different tools to carefully remove the damaged fastener from the work piece without damaging the work piece.

Although the embodiments of the extraction apparatus described herein are intended to be held and operated by a human operator, in other embodiments the extraction apparatus may be incorporated into a more automatic system. For example, the extraction apparatus may be mounted to or carried by a robotic operator that uses the extraction apparatus to autonomously remove the fastener pins from the work piece.

Figure 1:
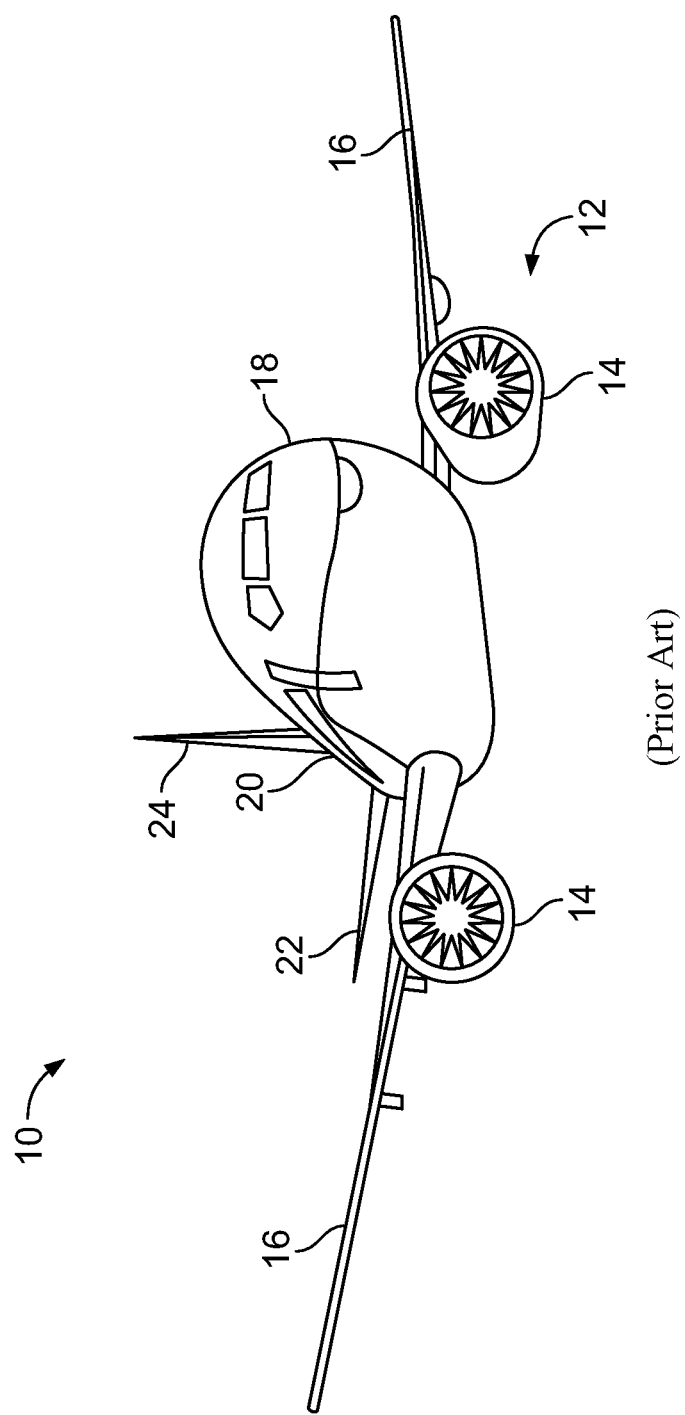
FIG. 1 illustrates a front perspective view of an aircraft according to an embodiment of the present disclosure.

FIG. 1 illustrates a front perspective view of an aircraft 10 (or aircraft assembly) according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The parts of the aircraft 10 may be produced and assembled together at one or more manufacturing facilities. One or more of the parts of the aircraft 10 may be produced using fastener pins 102 (shown in FIG. 2) that extend through holes in two or more panels or other components to temporarily clamp the panels or components together. A multitude of fastener pins 102 may be used, such as hundreds or thousands on a single work piece 104 (FIG. 1). After the fastener pins 102 are unlocked from the work piece 104, at least some of the fastener pins 102 may retain attached to the work piece 104, requiring a force up to or exceeding 10 lbf to remove the pin 102 from the work piece 104. Operators that repeatedly apply such forces for manually removing to a multitude of fastener pins 102 risk repetitive stress injuries.

The fuselage 18 of the aircraft 10 defines an interior cabin, which may include a cockpit, one or more work sections (for example, galleys, personnel carry-on baggage areas, and the like), one or more passenger sections (for example, first class, business class, and coach sections), and an aft section. Each of the sections may be separated by a cabin transition area, which may include one or more class divider assemblies. Overhead stowage bin assemblies may be positioned throughout the interior cabin.

Alternatively, instead of an aircraft, embodiments may be used with the manufacturing and production of various other vehicles, such as automobiles, buses, locomotives and train cars, sea craft, and spacecraft, or non-vehicles, such as furniture, windmills, buildings, and installations.

Figure 2:
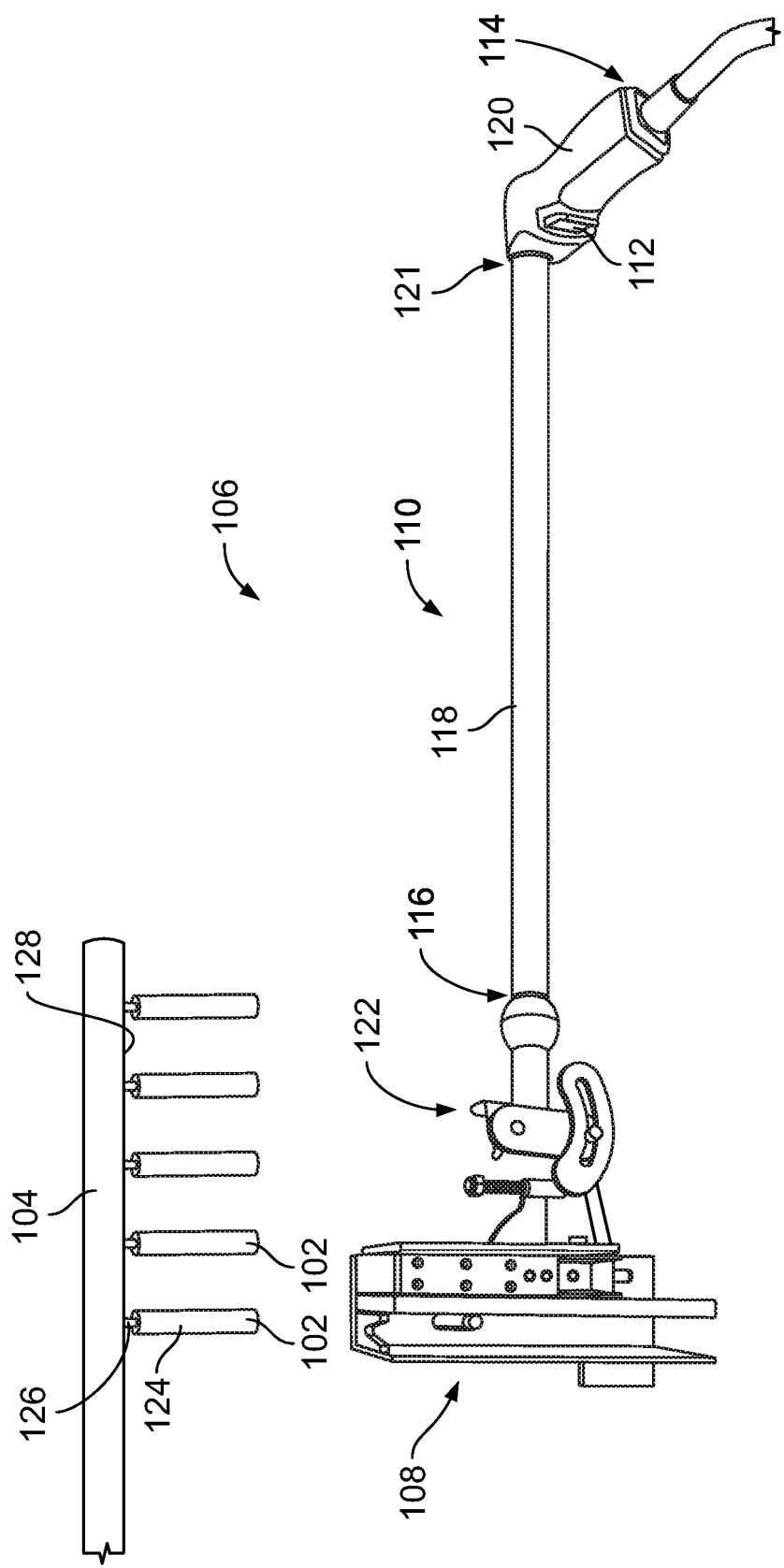
FIG. 2 is a perspective view of an extraction apparatus according to an embodiment of the present disclosure for removing a fastener pin from a work piece.

FIG. 2 is a perspective view of an extraction apparatus 106 according to an embodiment. The extraction apparatus 106 includes an extractor head 108 and an arm 110 that is coupled to and extends from the extractor head 108. The extractor head 108 is configured to remove fastener pins 102 from a work piece 104. For example, the extractor head 108 engages the fastener pins 102 one at a time and pulls the corresponding fastener pin 102 out of a hole (not shown) in the work piece 104. The arm 110 is configured to be held by an operator. The operator manipulates the arm 110 to position the extractor head 108 relative to the fastener pins 102. For example, the operator moves to the arm 110 to have the extractor head 108 engage the fastener pins 102 one by one. The operator may be a human, such that the arm 110 is designed to be held by a human using one or both hands to grasp the arm 110. Although designed for a human operator, the extraction apparatus 106 could be held by or incorporated into a fully autonomous or semi-autonomous (e.g., remote control) robot that represents the operator.

The extractor head 108 uses a power source, such as electricity or a compressed fluid, to dislodge each of the fastener pins 102 from the work piece 104. The work required to dislodge the fastener pins 102 is provided by the power source. The extraction apparatus 106 is configured such that the operator does not have to exert any pulling or pushing force in relation to the fastener pins 102. The work performed by the operator is to manipulate the arm 110 to position the extractor head 108 relative to the corresponding fastener pin 102, and optionally also to actuate a manual trigger 112 on the arm 110 that enables operation of the extractor head 108. The manual trigger 112 may be a safety aspect that prevents the extractor head 108 from operating unless the manual trigger 112 is depressed to prevent injuries.

The arm 110 is elongated between a first end 114 and a second end 116 that is opposite to the first end 114. The extractor head 108 is mechanically connected to the second end 116 of the arm 110. The extractor head 108 is connected to the second end 116 via a coupling assembly 122 that is configured to allow the extract head 108 to pivot and/or rotate relative to the arm 110 in order to adjust an angular orientation of the extractor head 108 relative to the arm 110. The coupling assembly 122 may include multiple components and fasteners, as described below with reference to FIG. 3.

In the illustrated embodiment, the arm 110 includes an elongate barrel 118. The barrel 118 is hollow. In one embodiment, the extractor head 108 is pneumatically-powered, and the barrel 118 is used to deliver a compressed fluid to the extractor head 108. The hollow barrel 118 of the arm 110 is configured to deliver the pressurized air to an actuator device on the extractor head 108 (e.g., the actuator device 204 shown in FIG. 3). The following description refers to pressurized air, but the compressed fluid used to power the extractor head 108 in other embodiments may be a different fluid, such as carbon dioxide, nitrogen, or the like.

In the illustrated embodiment, the arm 110 includes a handle 120 at the first end 114. The handle 120 is configured to be grasped and held by the operator. The handle 120 is connected to an end 121 of the barrel 118. The handle 120 includes the manual trigger 112, which is depressible by a finger of the hand of the operator holding the handle 120.

Although not shown in FIG. 2, the arm 110 may have an adjustable length between the first and second ends 114, 116, allowing the operator to adjust the reach of the extraction apparatus 106. For example, an operator may extend the length of the arm 110 to reach a first group of fastener pins 102 and may contract the length to reach a second group of fastener pins 102 that are closer to the operator than the first group. The arm 110 may be selectively lockable at a certain length via a twist-lock, a pin, or the like.

The fastener pins 102 in the illustrated embodiment have a body 124 and a shaft 126 extending from the body 124. The shafts 126 of the fastener pins 102 extend into holes (not shown) of the work piece 104. The fastener pins 102 extend from a first surface 128 of the work piece 104. The bodies 124 are spaced apart from the work piece 104 via lengths of the shafts 126. As described above, the fastener pins 102 may be used to clamp or secure components during the manufacturing process, such as when bonding two or more components together to form the work piece 104, sealing the work piece 104, curing the work piece 104, attaching other components to the work piece 104, or the like.

The fastener pins 102 may be selectively lockable between a clamping, locked state and a non-clamping, unlocked state. A torque gun or another tool may be used to selectively lock and unlock the fastener pins 102. Even after the fastener pins 102 are unlocked, the shafts 126 may remain affixed to the work piece 104 due to sealant on the shafts 126, damage to the shafts 126, debris in the holes, or the like. The extraction apparatus 106 is used to separate unlocked fastener pins 102 from the work piece 104. It is noted that the extraction apparatus 106 may not be configured to be used to remove fastener pins 102 that are in the clamping, locked states.

Figure 3:
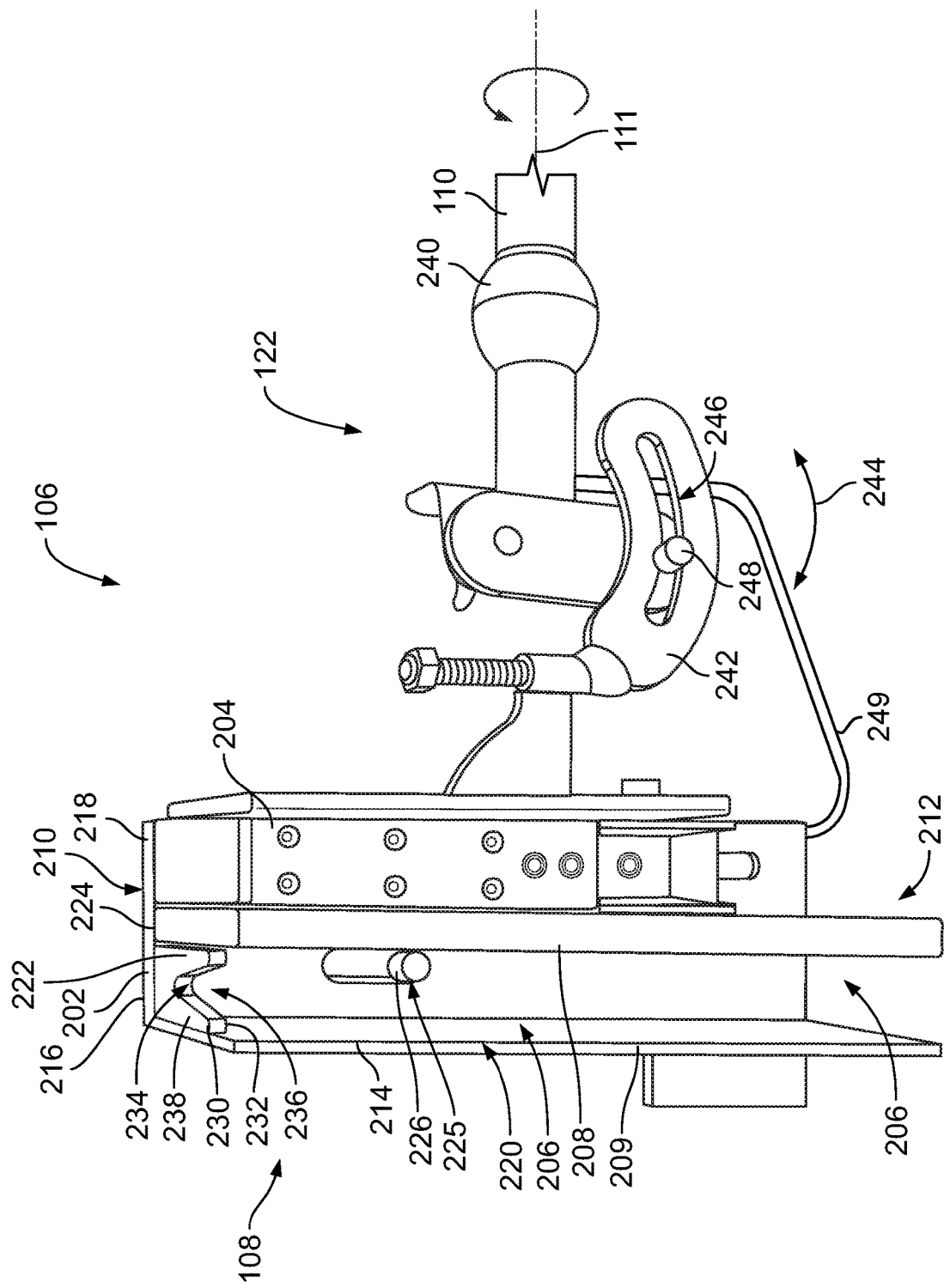
FIG. 3 is a close-up perspective view of an extractor head and coupling assembly of the extraction apparatus according to an embodiment of the present disclosure.

FIG. 3 is a close-up perspective view of the extractor head 108 and the coupling assembly 122 of the extraction apparatus 106 according to an embodiment. The extractor head 108 includes a housing 202 and an actuator device 204 mounted to the housing 202. The housing 202 defines a channel 206 that is sized and shaped to accommodate a single fastener pin 102 (shown in FIG. 2). For example, the housing 202 includes a support wall 208 and a side wall 209 that are spaced apart from each other and define the channel 206 therebetween. The housing 202 may be composed of a metal material, a polymer material, a composite material, or the like.

The extractor head 108 extends between a working end 210 and a collection end 212. In the illustrated orientation of the extractor head 108, the working end 210 is a top end, and the collection end 212 is a bottom end that is opposite to the top, working end 210. When the extraction apparatus 106 is in use, the working end 210 is placed proximate to the work piece 104 (shown in FIG. 2) and may abut the surface 128 (FIG. 2) of the work piece 104. The collection end 212 may support collection of the fastener pins 102 after removal from the work piece 104. For example, the collection end 212 of the extractor head 108 may be connected to a tube or chute for controlling the path of the fastener pins 108 that are separated from the work piece 104. Alternatively, the collection end 212 may be configured to drop the extracted fastener pins 102 into a bin without the use of an intervening tube.

The support wall 208 and the side wall 209 of the housing 202 both extend between the working end 210 and the collection end 212. The housing 202 has a front side 214 and a back side 216 that is opposite the front side 214. As used herein, relative or spatial terms such as "top," "bottom," "front," "rear," "left," and "right" are only used to distinguish the referenced elements in the illustrated orientations and do not necessarily require particular positions or orientations relative to the surrounding environment of the extraction apparatus 106. For example, the front side 214 may be behind the back side 216 when the extractor head 108 is rotated 180 degrees along an axis 111 of the arm 110. The housing 202 has a back wall 218 at the back side 216. The back wall 218 extends between the side wall 209 and the support wall 208. The back wall 218 may be integrally connected to the side wall 209 and/or the support wall 208, such that there is no connection seam at interfaces between the components. For example, the side wall 209 may be welded to the back wall 218 or formed in a common process, such as by stamping and forming or molding. The back wall 218 defines a back of the channel 206.

In the illustrated embodiment, the channel 206 extends from the working end 210 to the collection end 212. The channel 206 has a narrow, elongated length to accommodate the size and shape of the fastener pins 102 (FIG. 2). The channel 206 has a front opening 220 at the front side 214 of the housing 202 through which the fastener pin 102 is received into the channel 206. In an embodiment, the front opening 220 is defined between the side wall 209 and the support wall 208 at the front side 214 of the housing 202. The channel 206 extends a depth from the front opening 220 to the back wall 218.

The actuator device 204 is disposed on an opposite side of the support wall 208 from the channel 206. The actuator device 204 is mechanically connected to a fork member 222 that is disposed within the channel 206. The fork member 222 is movable relative to the housing 202 within the channel 206. The fork member 222 is configured to be moved by the actuator device 204. The actuator device 204 moves the fork member 222 along a path or stroke from a start position to a displaced position, and then back to the start position. The fork member 222 is in the start position in FIG. 3. In the start position, the fork member 222 is at or proximate to the working end 210. The actuator device 204 moves the fork member 222 towards the collection end 212 from the start position to the displaced position. The fork member 222 is configured to engage the fastener pin 102 (FIG. 2) that is received within the channel 206. The fork member 222 extracts the fastener pin 102 as the fork member 222 is moved from the start position to the displaced position by the actuator device 204.

The actuator device 204 in an embodiment is a linear actuator that moves the fork member 222 linearly between the start position and the displaced position. The actuator device 204 may be powered by electricity, compressed air, or the like. For example, in the illustrated embodiment the actuator device 204 is powered by compressed air that is delivered to the actuator device 204 through a passage 249. The passage 249 may be a conduit, hose or other suitable fluid delivery component. The passage 249 may extend along a length of the arm 110. In another embodiment, the actuator device 204 is powered by electricity received through a power cable that is located in place of the passage 249. The actuator device 204 may be mechanically connected to the fork member 222 via a rod or bridge member 224 that extends across the support wall 208. The bridge member 224 is disposed proximate to the back wall 218 in the illustrated embodiment.

The extractor head 108 also includes a switch 225 mounted within the channel 206. The switch 225 is mounted to the back wall 218 in the illustrated embodiment, but may be mounted to the side wall 209 or the support wall 208 in an alternative embodiment. The switch 225 is configured to detect reception of a fastener pin 102 (FIG. 2) within the channel 206. The fastener pin 102 detects the reception of the fastener pin 102 by changing states or signals in response to a fastener pin 102 entering the channel 206, and also in response to the fastener pin 102 exiting the channel 206. The changing state or signal is communicated to the actuator device 204, and is used to determine when the actuator device 204 moves the fork member 222 towards the displaced position.

The switch 225 in the illustrated embodiment is a mechanical switch 226 that extends into the channel 206 and is configured to engage the fastener pin 102 that is received within the channel 206. The fastener pin 102 causes the switch 226 to change states by displacing to a different physical position, deforming to adopt a different shape, or the like. The mechanical switch 226 may be disposed in the channel 206 such that the fastener pin 102 does not engage and actuate the switch 226 until the fastener pin 102 is fully loaded within the channel 206. The changing state of the mechanical switch 226 may be communicated to the actuator device 204 via a mechanical linkage. The mechanical linkage may include opening a valve that allows pressurized or compressed air to the actuator device 204, unlocking the actuator device 204 from a captive state, mechanically moves a switch to allow electrical current to a motor in the actuator device 204, or the like. Alternatively, the changing state of the mechanical switch 226 may be communicated to the actuator device 204 via an electrical signal pathway (e.g., a wireless or wired connection) that is used to open a valve, unlock the actuator device 204, activate the switch controlling current to the motor, or the like.

In another embodiment, the switch 225 is a proximity sensor 228 (shown in FIG. 4) instead of the mechanical switch 226 shown in FIG. 3. The proximity sensor 228 detects the reception of the fastener pin 102 within the channel 206 by detecting that the fastener pin 102 is within a designated threshold range or distance of the sensor. For example, the designated threshold range may be within 10 mm, within 5 mm, within 2 mm, or the like, of the proximity sensor. The proximity range is selected such that a fastener pin 102 is only within the threshold range when the fastener pin 102 is sufficiently loaded within the channel 206 to allow the fork member 222 to properly engage the fastener pin 102. For example, the proximity sensor 228 does not detect a fastener pin 102 that is only halfway within the channel 206 the fork member 222 may not properly engage the fastener pin 102 at that location relative to the extractor head 108. Upon detecting the reception of the fastener pin 102, the proximity sensor 228 may generate an electrical signal that is communicated to the actuator device 204. The proximity sensor 228 may have various forms, constructions, and/or working principles. For example, the proximity sensor 228 may be an electrical proximity switch, a capacitive displacement sensor, a magnetic proximity fuse, a reflective photosensor, a thermal infrared sensor, an ultrasonic sensor, a Hall Effect sensor, a fiber optics sensor, or the like.

In one or more embodiments, in response to the switch 225 detecting that a fastener pin 102 is received in the channel 106, the actuator device 204 is configured to automatically move the fork member 222 linearly within the channel 206 from the start position to the displaced position. The fork member 222 engages the fastener pin 102 and forces the fastener pin 102 away from the work piece 104 (FIG. 2) towards the collection end 212 of the extractor head 108. In an embodiment, the actuator device 204 does not move the fork member 222 from the start position unless the switch 225 detects the fastener pin 102 concurrently with the operator displacing the manual trigger 112 (shown in FIG. 2) on the handle 120 (FIG. 2) of the arm 110. Thus, both conditions may occur during a common time period before the actuator device 204 launches the fork member 222 towards the displaced position. The actuator device 204 may be disabled from moving the fork member 222 unless both conditions occur during a common time period.

The fork member 222 has a first side 230 and a second side 232 that is opposite the first side 230. The fork member 222 defines a slot 234 that extends through the fork member 222 from the first side 230 to the second side 232. The slot 234 is open at a front end 236 of the fork member 222. The front end 236 of the fork member 222 faces the front opening 220 of the channel 206 at the front side 214 of the housing 202. The slot 234 is optionally tapered from the front end 236 in a rearward direction towards the back wall 218. The portions 238 of the fork member 222 on either side of the slot 234 resemble claws. In an embodiment, the shaft 126 (FIG. 2) of the fastener pin 102 is configured to be received within the slot 234 of the fork member 222 as the fastener pin 102 is received in the channel 206 through the front opening 220. As the fork member 222 is moved towards the displaced position, the claw portions 238 engage a shoulder 302 (shown in FIG. 5) of the body 124 of the fastener pin 102, forcing the body 124 towards the collection end 212 of the extractor head 108. The fork member 222 in a non-limiting example is composed of a metal material.

In the illustrated embodiment, the coupling assembly 122 between the extractor head 108 and the arm 110 includes a rotary union 240 and a pivot coupler 242. The rotary union 240 is rotatable around the axis 111 of the arm 110 to allow for adjusting the rotational orientation of the extractor head 108 relative to the arm 110. The pivot coupler 242 is pivotable along an arc 244 to adjust an angular orientation of the extractor head 108 relative to the arm 110. The pivot coupler 242 in the illustrated embodiment includes a curved slot 246 that receives a post 248 therethrough to guide the pivoting movement of the extractor head 108 relative to the arm 110. The coupling assembly 122 may have other components and fasteners in other embodiments.

FIGS. 4-6 show cross-sectional views of the extractor head 108 of the extraction apparatus 106 (shown in FIG. 2) according to an embodiment at different stages of operation. For example, FIG. 4 shows a first stage in which the extractor head 108 has no fastener pin within the channel 206. FIG. 5 shows a second stage in which a fastener pin 102 that is attached to the work piece 104 is disposed within the channel 206. FIG. 6 shows a third stage in which the extractor head 108 has extricated the fastener pin 102 from the work piece 104.

In the illustrated embodiment, the actuator device 204 includes a piston 304 that moves within a cylinder 306. The fork member 222 is coupled to a distal end 308 of the piston 304. The actuator device 204 may be referred to as a slide cylinder. The movement of the piston 304 may be pneumatically-actuated or electrically-actuated. In the illustrated embodiment, the switch 225 is a proximity sensor 228. The proximity sensor 228 may be configured to detect the reception of fastener pin 102 within the channel 206 without requiring that the fastener pin 102 engages the sensor 228.

In the first stage shown in FIG. 4, the fork member 222 is held by the actuator device 204 in the start position. The fork member 222 at the start position is at, or at least proximate to, the working end 210 of the extractor head 108. The fastener pin 102 is received in the channel 206, as shown in FIG. 5, by moving the extractor head 108 to the fastener pin 102 that is attached to the work piece 104. For example, an operator may manipulate the arm 110 (shown in FIG. 2) to position and align the extractor head 108 with the pin 102 such that the stationary pin 102 is received through the front opening 220 into the channel 206. The fork member 222 is disposed between the body 124 of the fastener pin 102 and the work piece 104. Although not clearly shown in FIG. 5, the shaft 126 of the fastener pin 102 is received in the slot 234 (FIG. 3) of the fork member 222.

In response to detecting the fastener pin 102 as fully loaded within the channel 206 as well as the satisfaction of safety conditions (e.g., the manual trigger 112 shown in FIG. 2 is actuated by the operator), the actuator device 204 may automatically actuate, driving the fork member 222 to move from the start position shown in FIGS. 4 and 5 to the displaced position shown in FIG. 6.

The piston 304 retracts into the cylinder 306 as the actuator device 204 actuates, pulling the fork member 222 towards the collection end 212. As the fork member 222 moves, the second side 232 of the fork member 222 engages the shoulder 302 of the body 124 of the fastener pin 102 and forces the shoulder 302 towards the collection end 212. The distance that the fork member 222 moves from the start position to the displaced position may depend on the application, such as the thickness of the work piece 104 in which the fastener pin 102 is lodged. In a non-limiting example, the fork member 222 moves about 50 mm from the start position to the displaced position. The force applied to the body 124 of the fastener pin 102 may dislodge the shaft 126 from the work piece 104, allowing the fastener pin 102 to separate from the work piece 104. The channel 206 may be open at the collection end 212, allowing the extracted fastener pins 102 to fall out of the channel 206 through the collection end 212. In FIG. 6, the fastener pin 102 is free-falling in a downward direction 314 out of the channel 206. Once the fastener pin 102 has dropped out of the channel 206 and the switch 225 no longer detects the presence of a fastener pin 102 in the channel 206, the actuator device 204 moves the fork member 222 back towards the working end 210 to the start position in preparation for extraction of another fastener pin 102.

In an embodiment, the actuator device 204 is configured to limit the amount of force that is applied by the fork member 222 on each fastener pin 102 to prevent damage to the work piece 104. The actuator device 204 may be configured to initially apply a lower amount of force on the fastener pin 102, and then increase the amount of force without exceeding the upper limit. Alternatively, the actuator device 204 may initially apply the designated upper limit amount of force instead of varying the amount of force. For example, the actuator device 204 may have an upper limit of 15 lbf. If the extraction apparatus 106 fails to dislodge the pin 102 upon applying the upper limit amount of force, the operator has an indication that the fastener pin 102 may be damaged, and may use another type of tool to extricate the pin 102. Limiting the amount of force that the extraction apparatus 106 exerts on the fastener pins 102 reduces the risk that the extraction apparatus 106 damages the work piece 104 by exerting a large amount of force on a damaged fastener pin 102 in an attempt to dislodge the fastener pin 102 from the work piece 104.

FIG. 7 is a perspective view of the arm 110 of the extraction apparatus 106 (shown in FIG. 2) according to an embodiment. In the illustrated embodiment, the arm 110 is configured for use with a pneumatic actuator device. For example, the actuator device 204 (shown in FIG. 6) of the extractor head 108 (FIG. 6) may be a pneumatic actuator device configured to utilize compressed air to move the fork member 222 (FIG. 6) between the start and displaced positions.

The arm 110 is configured to deliver the compressed air to the pneumatic actuator device on the extractor head 108. For example, the compressed air may be directed through the hollow elongate barrel 118 of the arm 110. The compressed air may flow to the extractor head 108 through the rotary union 240. Although not shown in FIGS. 3 and 7, an air hose may extend between the actuator device 204 and the rotary union 240 to enable delivery of the compressed air from the arm 110 to the actuator device 204.

The barrel 118 of the arm 110 receives pressurized air from a pressurized air storage tank 402 via a hose 404. The hose 404 is coupled to the arm 110 via a pneumatic coupling 406. The pneumatic coupling 406 is configured to removably connect the hose 404 to the arm 110. For example, the pneumatic coupling 406 may have a quick-release mechanism. The pneumatic coupling 406 may be located at the first end 114 of the arm 110, at or proximate to the end 121 of the barrel 118. In the illustrated embodiment, the pneumatic coupling 406 is connected to a base end 410 of the handle 120. In other embodiments, the pneumatic coupling 406 may be directly connected to the barrel 118 and/or located more proximate to the second end 116 of the arm 110. The pressure of the pressurized air that is delivered to the arm 110 may vary depending on the application. In one non-limiting example, the pressurized air has a pressure around 100 psi.

The manual trigger 112 controls delivery of the pressurized air to the pneumatic actuator device on the extractor head 108 (shown in FIG. 6). For example, displacement of the trigger 112 by the operator causes the pressurized air to be delivered to the extractor head 108, which enables the pneumatic actuator device to launch the fork member 222 (FIG. 6) to the displaced position. The manual trigger 112 may be operatively connected to a valve (not shown) or the like, such that displacement of the trigger 112 opens the valve, allowing the flow of pressurized air to the extractor head 108. The valve may be within the barrel 118 or the handle 120. The manual trigger 112 may be mechanically connected to the valve via a mechanical linkage. Alternatively, the manual trigger 112 may be electrically connected to the valve, such that displacement of the trigger 112 generates an electrical signal to open the valve. In an embodiment, the pressurized air is not delivered to the extractor head 108 when the manual trigger 112 is in a resting, non-displaced position. For example, the valve may be biased towards the closed position, preventing the flow of pressurized air, and only opens when the manual trigger 112 is pressed (e.g., displaced) by the operator.

In an embodiment, the arm 110 also includes a second manual trigger 412 that is spaced apart from the first manual trigger 112 along the length of the arm 110. The second manual trigger 412 may be located between the extractor head 108 (FIG. 6) and the first manual trigger 112 along the length of the arm 110. The two manual triggers 112, 412 may be spaced apart a sufficient distance such that the operator is not able to press both triggers 112, 412 with a single hand. For example, the manual triggers 112, 412 may be spaced apart from each other at least 25 cm or at least 30 cm, which prevents both manual triggers 112, 412 being depressed with a single hand. The two manual triggers 112, 412 are configured to be engaged by different hands of the same operator holding the extraction apparatus 106 (FIG. 2). For example, one hand of the operator engages the first trigger 112, and the other hand of the operator engages the second trigger 412.

Like the first manual trigger 112, the second manual trigger 412 is configured to control the delivery of the pressurized air to the extractor head 108. For example, the second manual trigger 412 is operatively connected to a valve that opens to allow the flow of pressurized air therethrough in response to the displacement or depression of the trigger 412. The two triggers 112, 412 may be connected to the same or different valves. In an embodiment, both of the triggers 112, 412 are required to be displaced (e.g., depressed) concurrently before the pressurized air is delivered to the extractor head 108. The manual triggers 112, 412 are configured to interrupt the supply of pressurized air through the barrel 110 when not depressed, such that the actuator device 204 is disabled from moving the fork member 222 unless both of the manual triggers 112, 412 are concurrently displaced. Accordingly, the manual triggers 112, 412 permit communication of pressurized air through the hollow barrel 110, and through the union 240 and the passage 249 (shown in FIG. 3) to the actuator device 204 on the extractor head 208. The passage 249 may be a conduit, hose or other suitable fluid delivery component. The second manual trigger 412 may be a dead man trigger that is provided for safety. The extractor head 108 is not operable unless both hands of the operator are on the arm 110 engaging the corresponding manual triggers 112, 412. The second manual trigger 412 is optional.

With additional reference to FIG. 6, it is recognized that although the manual triggers 112, 412 control the delivery of pressurized air to the pneumatic actuator device (e.g., the actuator device 204) in the extractor head 108, the actuator device 204 does not actuate and launch the fork member 222 towards the displaced position unless the switch 225 detects the presence of the fastener pin 102 within the channel 206 concurrently with the engagement of the triggers 112, 412. In an embodiment, all three conditions (e.g., depression of both triggers 112, 412 and actuation of the switch 225) may be required concurrently (e.g., during a common time period) before the actuator device 204 moves the fork member 222 towards the displaced position.

FIG. 8 is a perspective view of a portion of the arm 110 of the extraction apparatus 106 (shown in FIG. 2) according to another embodiment. In the illustrated embodiment, the arm 110 is configured for use with an electric actuator device. For example, the actuator device 204 (shown in FIG. 6) of the extractor head 108 (FIG. 6) may be an electric actuator device configured to utilize electrical energy (e.g., electric current) to move the fork member 222 (FIG. 6) between the start and displaced positions. The electrical energy may be supplied to a motor (not shown) within the electrical actuator device 204 to propel the movement of the piston 304 (FIG. 6). The motor may be an AC motor, such as a servo-motor or the like. In the illustrated embodiment, the displacement of the manual trigger 112 enables delivery of the electrical energy to the motor of the actuator device 204, such as by activating an electrical switch.

In the illustrated embodiment, the electrical energy is supplied to the actuator device 204 (FIG. 6) by a battery 502 that is mounted to the arm 110. The battery 502 is mounted to the base end 410 of the handle 120, but may be mounted to a different portion of the arm 110 or to the extractor head 108 (FIG. 6) in another embodiment. The battery 502 may be removable from the arm 110, such as for recharging and/or replacing the battery 502. The battery 502 may be conductively connected to the extractor head 108 via one or more power wires or cables (not shown) that extend through (or along the outside of) the barrel 118.

In an alternative embodiment, the electrical energy is supplied to the electrical actuator device 204 by a power cable (not shown) that is connected to an external electrical power source. For example, the power cable may extend from the base end 410 of the handle 120, such that the arm 110 has no battery. The power cable may be plugged into a power outlet to establish the flow of electrical energy to the electrical actuator device 204.

Figure 9:
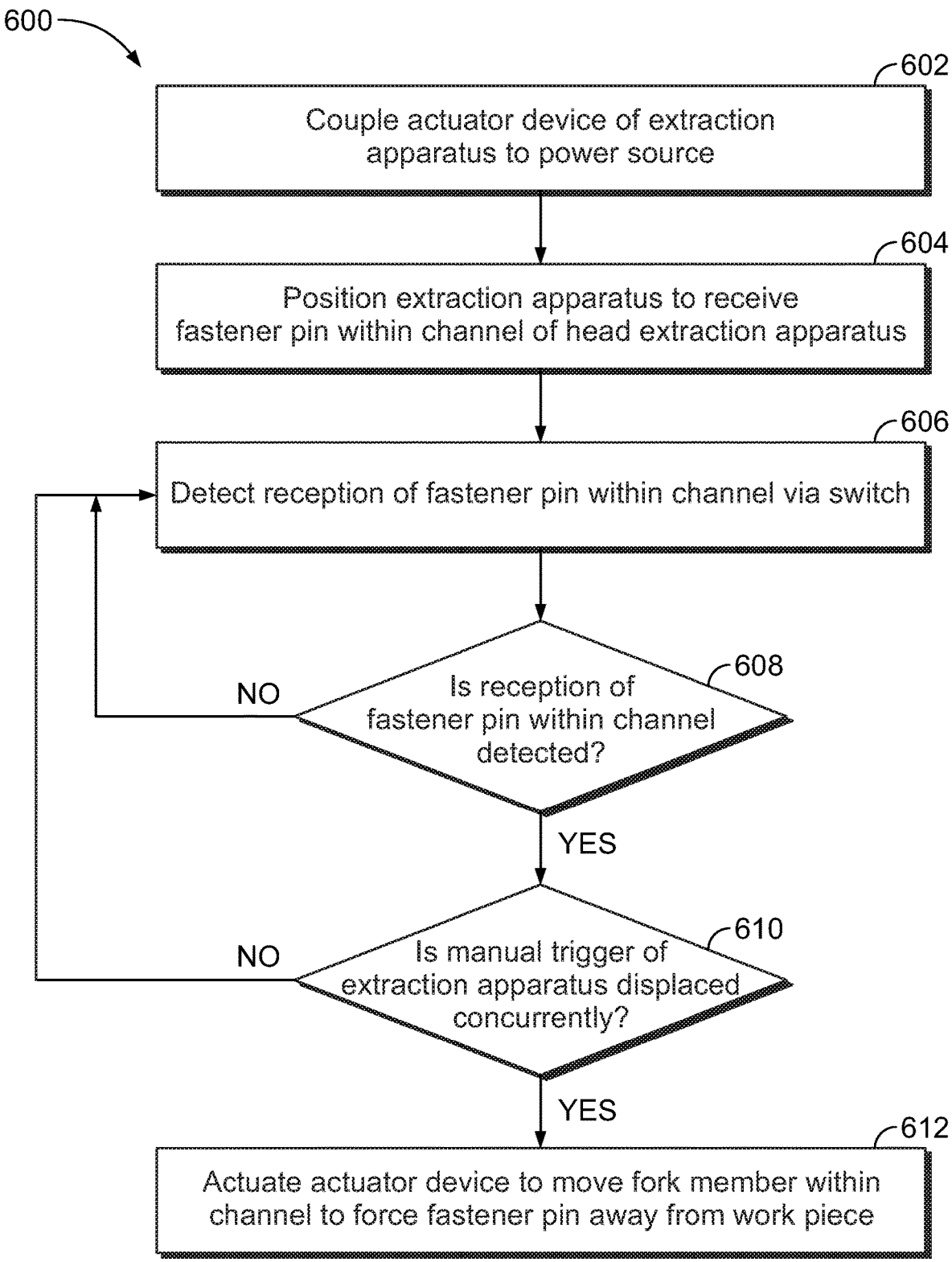
FIG. 9 is a flow chart of a method of removing a fastener pin from a work piece using an extraction apparatus according to an embodiment.

FIG. 9 is a flow chart of a method 600 of removing a fastener pin from a work piece according to an embodiment. The method 600 uses an extraction apparatus to remove the fastener pin, which may be one or more of the embodiments of the extraction apparatus 106 shown in FIGS. 2-8.

At 602, an actuator device of an extraction apparatus is coupled to a power source. The extraction apparatus includes an extractor head and an elongated arm that is mechanically coupled to the extractor head. The actuator device is mounted on the extractor head. The extractor head defines a channel. The arm includes a manual trigger configured to be engaged by an operator holding the extraction apparatus. In an embodiment, the actuator device is a pneumatic actuator device, and the power source is a pressurized air storage tank that delivers pressurized air to the pneumatic actuator device. For example, the pneumatic actuator device may be a pneumatically-actuated slide cylinder. In another embodiment, the actuator device is an electric actuator device, and the power source is a battery and/or an external power outlet. For example, the actuator device may include a motor that operates based on electrical energy (e.g., current) received from the battery or the power outlet via electrical power wires or cables.

At 604, the extraction apparatus is positioned to receive a fastener pin within the channel of the extractor head of the extraction apparatus. The fastener pin may be attached to a work piece, such as a panel of an aircraft. The extraction apparatus is positioned to receive the fastener pin by the operator manipulating the arm such that the channel of the extractor head aligns with the fastener pin, and the extractor head at least partially envelops the fastener pin as the operator moves the extractor head onto the fastener pin. In an embodiment, the extractor head includes a fork member within the channel. The fork member defines a slot that is open at a front end that faces towards a front opening in the channel through which the fastener pin is received into the channel. The extraction apparatus is positioned such that a shaft of the fastener pin is received within the slot of the fork member as the fastener pin is received into the channel.

At 606, reception of a fastener pin within the channel is detected via a switch of the extraction apparatus that is mounted within the channel. The switch is configured to detect the presence of a fastener pin within the channel. The switch is operatively connected to the actuator device. For example, the switch may be connected to the actuator device via an electrical wireless or wired pathway, a mechanical linkage, or the like. In one embodiment, the switch within the channel is a mechanical switch, and the fastener pin is detected within the channel responsive to the fastener pin engaging and displacing the mechanical switch. In another embodiment, the switch is an electrical proximity sensor that is configured to detect the reception of the fastener pin within the channel responsive to the fastener pin entering a designated proximity range of the sensor. Although the switch is described herein as "detecting" the presence of a fastener pin, it is recognized that the switch may be a passive component that does not actively monitor for a fastener pin.

At 608, a determination is made whether, at a given time, reception of a fastener pin within the channel of the extractor head is detected by the switch. If no fastener pin is detected within the channel at the given time, the flow returns to 606. On the other hand, if reception of the fastener pin is detected in the channel, then flow continues to 610. At 610, a determination is made whether the manual trigger on the arm of the extraction apparatus is displaced by the operator concurrently with the detection of the fastener pin by the switch. The operator displaces the manual trigger by pressing the trigger with a finger as the operator holds the arm. If not, then flow returns to 606. On the other hand, if both conditions occur during a common, overlapping time period, even if the conditions have different start and end times, then flow continues to 612.

At 612, the actuator device is automatically actuated to move the fork member of the extractor head within the channel such that the fork member engages and forces the fastener pin away from the work piece. The movement of the fork member is configured to dislodge and separate the fastener pin from the work piece. In the embodiment in which the actuator device is a pneumatic actuator device, the actuator device moves the fork member within the channel using pressurized air received from a pressurized air storage tank. The pressurized air may be delivered to the actuator device through the arm of the extraction apparatus. In the alternative embodiment in which the actuator device is an electric actuator device, the actuator device moves the fork member within the channel using electrical energy received from the battery or the power cable that is plugged into an electrical outlet.

After successfully extricating the fastener pin from the work piece, the flow of the method 600 optionally may return to 604 as the operator may position the extraction apparatus for removing another fastener pin from the work piece.

Referring to FIGS. 1-9, embodiments of the present disclosure provide an extraction apparatus 106 that is configured to be held by an operator for extracting unlocked fastener pins from a work piece. The extraction apparatus 106 is more ergonomic and requires less manual effort (e.g., less strenuous) than manually removing the fastener pins from the work piece. The extraction apparatus 106 may operate automatically or semi-automatically, using a switch 225 within the channel 206 of the extractor head 108 to trigger the actuation of the actuator device 204. The extraction apparatus 106 may include manual trigger(s) 112, 412 that enables operation of the actuator device 204 when the manual trigger(s) 112, 412 are pressed by the operator. The extraction apparatus 106 may be pneumatically-powered using pressurized air or electrically-powered. The force exerted by the actuator device 204 may have a designated upper limit to prevent damage to the work piece when extricating the fastener pins from the work piece.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and may include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An extraction apparatus comprising:
   an elongate arm having a first end and second end; and
   an extractor head mechanically connected to the second end of the arm, the extractor head comprising:
      a housing that defines a channel;
      a switch within the channel configured to detect reception of a fastener pin within the channel;
      a fork member within the channel and movable relative to the housing, the fork member configured to engage the fastener pin that is within the channel; and
      an actuator device mounted to the housing and mechanically connected to the fork member, the actuator device operatively connected to the switch, wherein, responsive to the switch detecting the reception of the fastener pin in the channel, the actuator device is configured to automatically move the fork member linearly within the channel from a start position towards a displaced position causing the fork member to remove the fastener pin from a work piece.

2. The extraction apparatus of claim 1, wherein the extractor head is mechanically connected to the second end of the arm via a coupling assembly, the coupling assembly configured to one or more of pivot or rotate to adjust an orientation of the extractor head relative to the arm.

3. The extraction apparatus of claim 1, wherein the actuator device is a pneumatic actuator device that is configured to move the fork member from the start position to the displaced position using pressurized air.

4. The extraction apparatus of claim 3, wherein the arm includes a hollow barrel that is configured to deliver the pressurized air to the actuator device on the extractor head via a rotary union.

5. The extraction apparatus of claim 4, wherein the arm includes two manual triggers spaced apart along the length of the arm between the first and second ends, being spaced apart a sufficient distance to prevent both manual triggers from being depressed with a single hand, wherein the manual triggers are configured to interrupt the supply of pressurized air when not depressed, such that the actuator device is disabled from moving the fork member unless both of the manual triggers are concurrently displaced by the operator.

6. The extraction apparatus of claim 1, wherein the actuator device is an electric actuator device that is configured to move the fork member from the start position to the displaced position using electrical energy supplied by one or more of a battery mounted to the arm or a power cable plugged into an external electrical power source.

7. The extraction apparatus of claim 1, wherein the arm includes a handle at the first end of the arm configured to be held by an operator, the handle including a manual trigger, wherein the actuator device is disabled from moving the fork member unless the manual trigger is displaced by the operator.

8. The extraction apparatus of claim 1, wherein the switch within the channel is a mechanical switch that is configured to detect the reception of the fastener pin within the channel responsive to the fastener pin engaging and displacing the mechanical switch.

9. The extraction apparatus of claim 1, wherein the switch within the channel is a proximity sensor that is configured to detect the reception of the fastener pin within the channel responsive to detecting that the fastener pin is within a designated threshold range of the proximity sensor.

10. The extraction apparatus of claim 1, wherein the fork member defines a slot that extends through the fork member between first and second sides of the fork member, the slot being open along a front end of the fork member that faces towards a front opening of the channel at a front side of the housing, the fork member configured to receive a shaft of the fastener pin within the slot as the fastener pin is received into the channel through the front opening.

11. The extraction apparatus of claim 1, wherein the extractor head has a working end and a collection end opposite to the working end, the fork member moving towards the collection end from the start position towards the displaced position, wherein the channel is open at the collection end to allow the fastener pin that is removed from the work piece to exit the channel through the collection end.

12. A method of removing a fastener pin from a work piece comprising:
   coupling an actuator device of an extraction apparatus to a power source, the extraction apparatus including an extractor head and an elongated arm that is mechanically coupled to the extractor head, the actuator device mounted on the extractor head, the extractor head defining a channel, the arm including a manual trigger configured to be engaged by an operator;
   positioning the extraction apparatus such that a fastener pin attached to a work piece is received into the channel of the extractor head;
   detecting reception of the fastener pin within the channel via a switch mounted within the channel, the switch operatively connected to the actuator device; and
   responsive to the detection of the reception of the fastener pin within the channel occurring concurrently with displacement of the manual trigger, automatically actuating the actuator device to move a fork member of the extractor head within the channel such that the fork member engages and forces the fastener pin away from the work piece.

13. The method of claim 12, wherein the actuator device is a pneumatic actuator device and the power source is a pressurized air storage tank, the pneumatic actuator device configured to move the fork member within the channel using pressurized air received from the pressurized air storage tank.

14. The method of claim 12, wherein the actuator device is an electric actuator device and the power source is a battery, the electric actuator device configured to move the fork member within the channel using electrical energy received from the battery.

15. The method of claim 12, wherein the switch within the channel is a mechanical switch and the reception of the fastener pin within the channel is detected responsive to the fastener pin engaging and displacing the mechanical switch.

16. The method of claim 12, wherein the fork member defines a slot that is open at a front end of the fork member that faces towards a front opening of the channel, wherein positioning the extraction apparatus includes aligning the fork member with the fastener pin such that a shaft of the fastener pin is received within the slot of the fork member as the fastener pin is received into the channel through the front opening.

17. An extraction apparatus comprising:
an extractor head defining a channel sized and shaped to receive a fastener pin therein, the extractor head including a pneumatically-actuated slide cylinder that is operatively coupled to a switch disposed within the channel of the extractor head, the switch configured to detect reception of the fastener pin within the channel, the slide cylinder mechanically coupled to a fork member disposed within the channel; and
an elongate barrel having a first end and a second end, the second end mechanically connected to the extractor head, the elongate barrel configured to deliver pressurized air to the slide cylinder on the extractor head, the elongate barrel including a manual trigger that controls delivery of the pressurized air to the slide cylinder,
wherein, responsive to displacement of the manual trigger occurring concurrently with detection of the reception of the fastener pin within the channel by the switch, the slide cylinder uses the pressurized air to move the fork member within the channel, forcing the fastener pin away from a work piece.

18. The extraction apparatus of claim 17, wherein the elongate barrel is fluidly connected to the slide cylinder on the extractor head via one or more of a rotary union or a pivoting union to allow for adjustment of an orientation of the extractor head relative to the elongate barrel.

19. The extraction apparatus of claim 17, wherein the manual trigger is a first manual trigger disposed proximate to the first end of the elongate barrel, and the elongate barrel further comprises a second manual trigger disposed proximate to the second end of the elongate barrel, the second manual trigger controlling delivery of the pressurized air to the slide cylinder, wherein the pressurized air is delivered from the elongate barrel to the slide cylinder responsive to concurrent displacement of both of the first and second manual triggers.

20. The extraction apparatus of claim 17, wherein the elongate barrel includes a pneumatic coupling at the first end that is configured to removably couple to an air hose.

* * * * *